Figure 1:
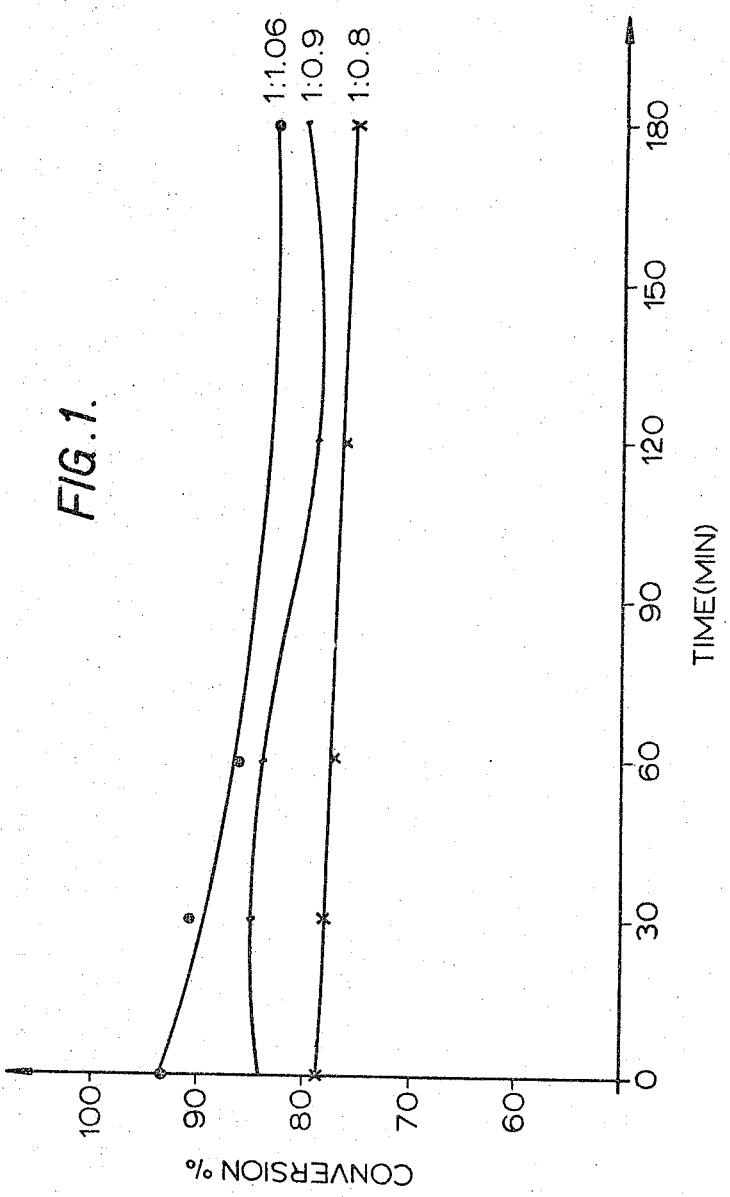
Figure 2:
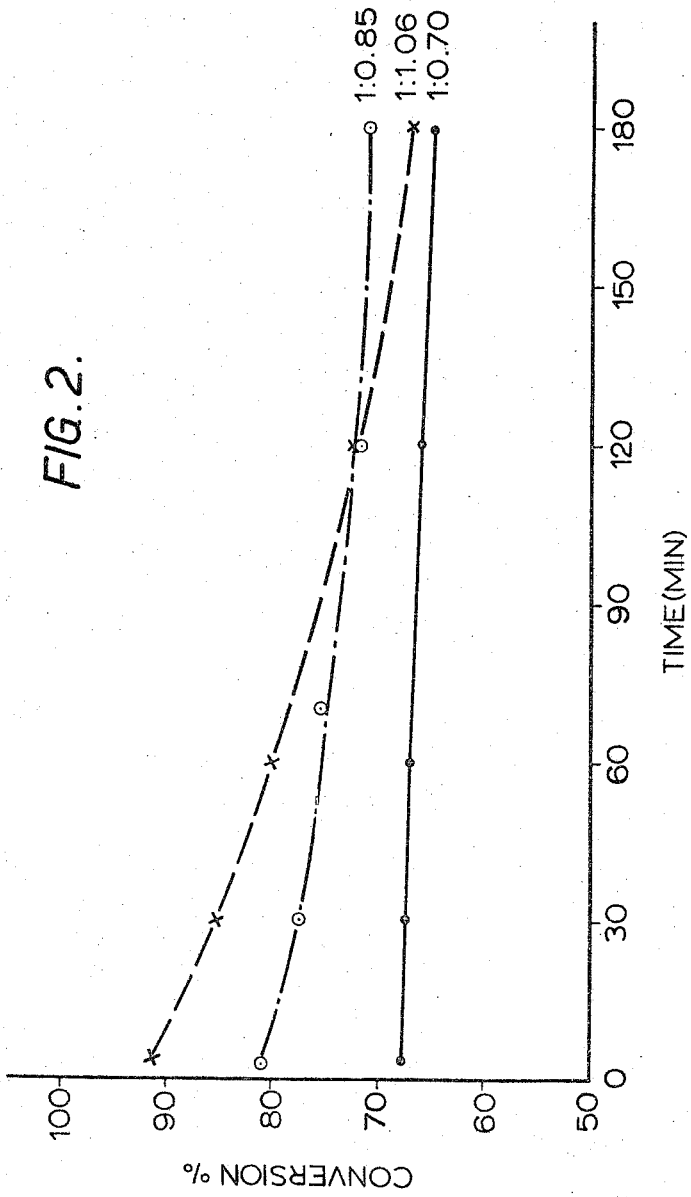
Figure 3:
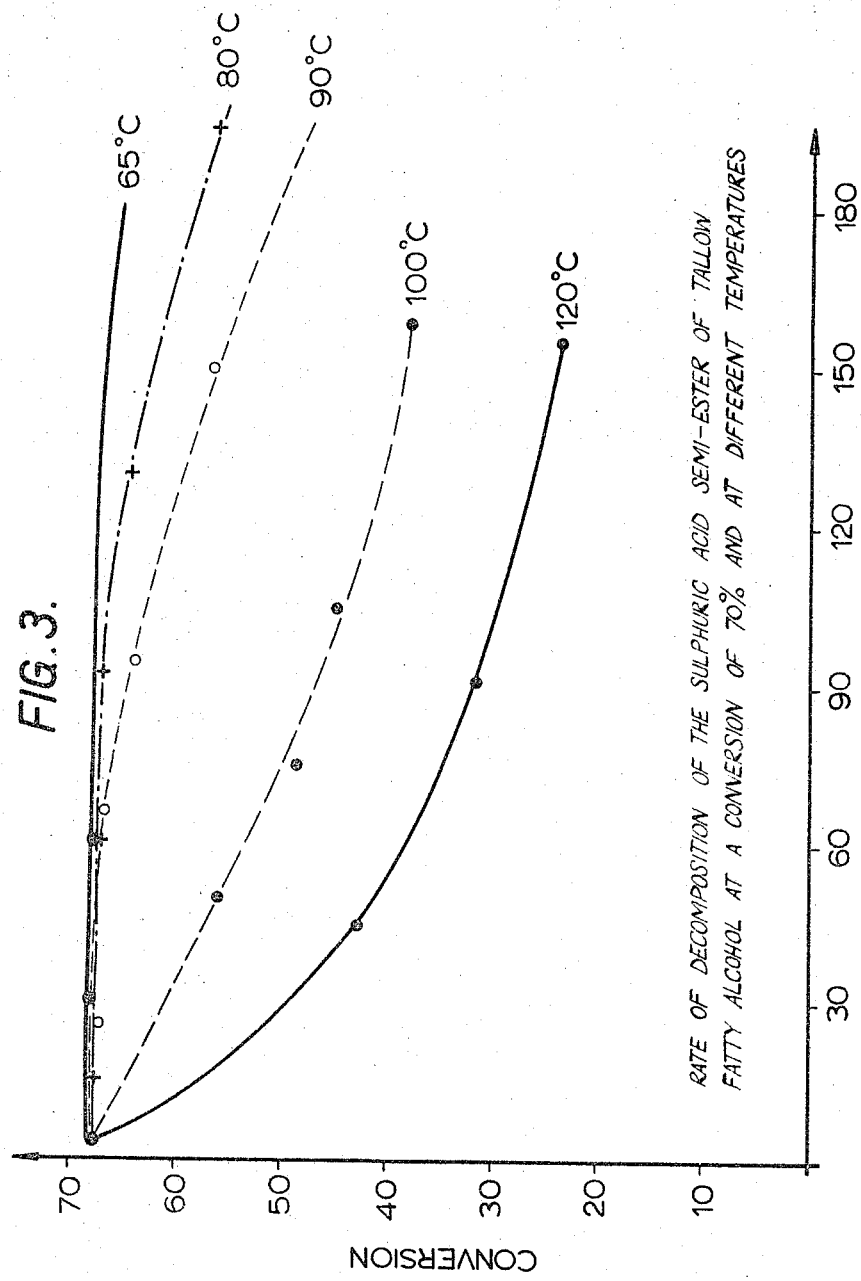
Figure 4:
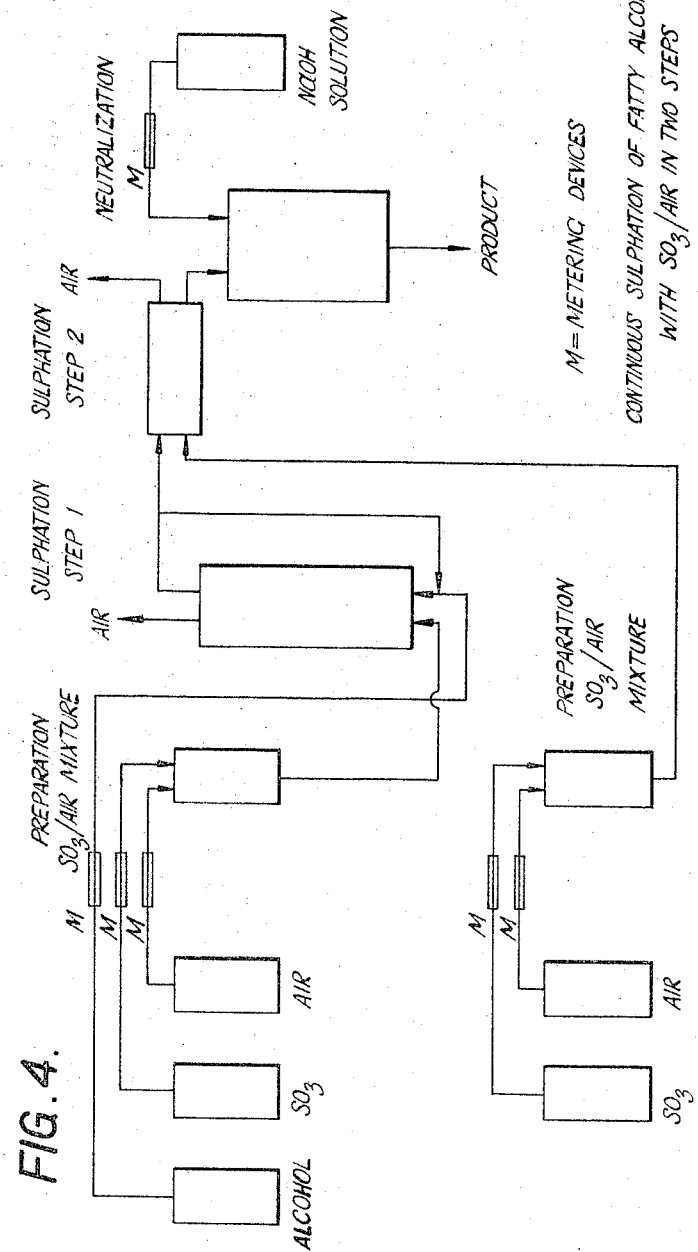
Figure 5:
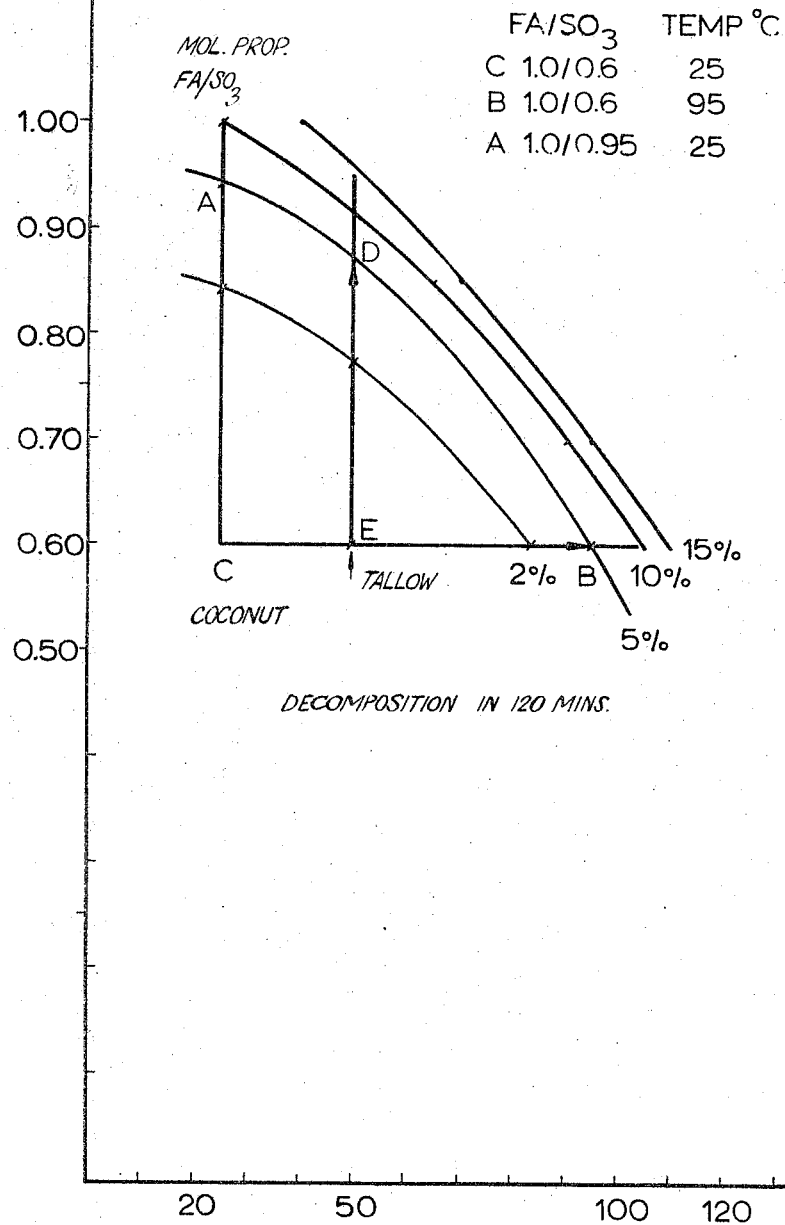

United States Patent Office 3,309,392
Patented Mar. 14, 1967

3,309,392
PREPARATION OF SULFATE ESTERS OF FATTY ALCOHOLS OR ETHYLENE OXIDE CONDENSATES THEREOF
Pieter Roele, Vlaardingen, Netherlands, assignor to Lever Brothers Company, New York, N.Y., a corporation of Maine
Filed Oct. 10, 1963, Ser. No. 315,279
Claims priority, application Great Britain, Oct. 12, 1962, 38,816/62
5 Claims. (Cl. 260—459)

This invention relates to a process for the sulphation of aliphatic alcohols and related compounds.

More particularly the invention is concerned with a process for the sulphation of aliphatic alcohols having at least 8 carbon atoms in the molecule or alkyl oxyalkylene alcohols having at least 8 carbon atoms in the alkyl group in which process a mixture of sulphur trioxide and an inert gas such as nitrogen, air or carbon dioxide is used as the sulphating agent.

Many processes for the preparation of alkyl sulphates and alkyl ether sulphates are known. Common sulphating agents are sulphuric acid, oleum and chlorosulphonic acid. These agents however have certain disadvantages. When sulphuric acid and oleum are used, an excess of these agents is necessary to obtain conversion to the sulphuric acid monoester, so that the neutralised product contains substantial amounts of inorganic sulphate, while chlorosulphonic acid gives rise to considerable corrosion owing to the hydrogen chloride liberated during the reaction.

The vigorous activity of sulphur trioxide is generally recognised as an advantage as is the fact that it reacts in a stoichiometric amount. For this reason a sulphur trioxide/inert gas mixture is frequently used as a sulphonating agent. However, when a sulphur trioxide/inert gas mixture is used as a sulphating agent for aliphatic alcohols or alkyl oxyalkylene alcohols, difficulties arise. The reaction is strongly exothermic and since the sulphuric acid monoester formed is sensitive to attack by heat, it is necessary to adopt special measures to avoid considerable decomposition and discolouration of the reaction product. Previously suggested processes for the production of alkyl sulphates and alkyl ether sulphates using sulphur trioxide/inert gas have required short residence times in the sulphating apparatus and elaborate and expensive cooling means in order to obtain products of good quality.

It has now been found that if the material to be sulphated is not wholly converted to the sulphuric acid ester by the sulphur trioxide/inert gas mixture but the conversion is allowed to proceed to a certain point, which depends on the particular reactants and conditions employed and which can be determined experimentally, the ester is substantially stable in the reaction mixture.

The sulphation up to this point need not be carried out quickly because the sulphuric acid ester formed is substantially stable in the system. Since with a suitable selection of reaction conditions a relatively long residence time (of the order of one or two hours) can be tolerated, the use of complicated and expensive cooling means can be avoided and conventional sulphating or sulphonating apparatus and procedures used. The sulphation is completed in a second stage with a relatively short residence time. The sulphation process of the invention is characterised in that it is carried out in two stages, in the first of which the alcoholic material is reacted with an amount of sulphur trioxide smaller than that stoichiometrically required for complete conversion of the alcoholic material to ester, the process is then interrupted and the reaction completed in a second stage. The rate of sulphation during the second stage should be as high as is consistent with obtaining a product of good quality but the rate of sulphation during the first stage can be much lower. Expressed in another way the residence time in the second stage should be short but there is no need for a short residence time in the first stage. The completion of the reaction is preferably immediately followed by neutraliation. The reaction conditions in each stage are dependent on the type of alcoholic material to be sulphated, and have to be determined experimentally before the process can be carried out. In general, in the first stage the alcoholic material is sulphated to such an extent and in such a manner that during the residence time in this first stage a decomposition of the partially converted reaction product of less than 5%, preferably of less than 1%, occurs. The residence time for the first stage may be of the order of one or two hours. In the second stage the residence time is of the order of one to fifteen minutes. In this way yields of more than 95% are obtainable. The first stage can be carried out batchwise, semi-continuously or continuously. The second step is preferably carried out continuously. The process of the invention is especially suitable for alcohols having a melting point above 50° C., e.g. tallow alcohols, as these were hitherto extremely difficult to sulphate satisfactorily with an sulphur trioxide/inert gas mixture. Other alcohols to which the process of the invention may be applied are lauryl, myristyl, and coconut alcohols.

The invention is illustrated by the following examples.

EXAMPLE 1

This example illustrates the sulphation of tallow alcohol with sulphur trioxide/air in two stages according to the present invention. The process was carried out in an apparatus as shown First stage in flow sheet Figure IV: 1290 g. tallow alcohol (5 moles) was sulphated with 280 g. (3.5 moles) of sulphur trioxide, the molar ratio of alcohol to sulphur trioxide being 1:0.7. The amount of air used was 1,000 litres, the reaction temperature 60–65° C., and the reaction time 60 minutes. A conversion of tallow alcohol to tallow alcohol sulphuric acid ester of 67% was obtained.

Second stage: The reaction products from the first stage and the sulphur trioxide/air mixture in an amount sufficient to give 1.9 moles of sulphur trioxide were fed into a small tubular reactor. The temperature of the reaction mixture was kept at about 60° C. by cooling. The residence time in the tubular reactor was less than one minute. The product from the reactor was immediately neutralised.

The final product gave the following analysis:

| | Percent |
|---|---|
| Tallow alcohol sulphate | 14.5 |
| Non-detergent organic matter | 0.5 |
| Conversion | 95.3 |

For purposes of comparison only, a conventional batch process and a conventional continuous process for the sulphation of tallow alcohol are described below. These are not examples of the present invention.

Conventional batch sulphation process 907 g. tallow alcohol (3.5 moles) was fed into a cylindrical reactor. The sulphur trioxide/air mixture formed by passing 1 cu. metre of air per hour through a vessel containing 297 g. stabilised sulphur trioxide at a constant temperature of 95° C. was fed through a multi-port ejector at a speed of 50 metres per second into the reactor in which the tallow alcohol was stirred. The heat of the reaction was dissipated by means of a cooling jacket, the temperature of the reaction mass being maintained at 60–65° C. The reaction time was two hours. The reaction product after neutralisation to a pH of 8 gave the following analysis:

|  | Percent |
|---|---|
| Tallow fatty alcohol sulphate | 13.6 |
| Non-detergent organic matter | 1.3 |
| Conversion | 88.0 |

*Conventional continuous sulphation process*

Tallow alcohol in a reactor was circulated at high speed by means of a sulphur trioxide/air mixture. After the tallow alcohol present in the reactor was completely sulphated, tallow alcohol and sulphur trioxide/air were dosed into the reactor in the proportions given below and an equivalent amount of tallow alcohol sulphuric acid monoester was discharged from the reactor and immediately neutralised. At a production rate of 1 mole of tallow alcohol sulphate per 26 minutes, 258 g. tallow alcohol was used (equivalent to addition of 12.2 ml. per minute) and 85 g. sulphur trioxide (equivalent to addition of 1.7 ml. per minute). The reaction temperature was maintained at 60–65° C. and the average residence time was 20 minutes. The reaction product after neutralisation gave the following analysis:

| Tallow alcohol sulphate | 17.5 |
|---|---|
| Non-detergent organic matter | 1.9 |
| Conversion | 87.0 |

EXAMPLE 2

This example illustrates the sulphation of coconut fatty alcohol with sulphur trioxide/air in two stages according to the present invention.

First stage: This was carried out batchwise by reacting the alcohol and sulphur trioxide in a molar ratio of 1:0.8 at a temperature of 40–45° C. for 1½ hours. A conversion of tallow alcohol to tallow alcohol sulphuric acid ester of 78.5% was obtained.

Second stage: The reaction products from the first stage at 25° C. and the sulphur trioxide/air mixture (12% excess of mixture) were fed into a small tubular reactor. No cooling was applied. The outlet temperature of the reactor was 68–69° C. After neutralisation, analysis of the final product showed the figure for conversion to sulphate to be 94–95%.

FIGURE V illustrates how the necessary conditions for the first stage of the reaction can be determined from simple experiments measuring the percentage decomposition of the alcohol sulphuric acid ester formed at different molar sulphur trioxide:alcohol ratios and different temperatures. In the figure axis X denotes the reaction temperature, axis Y indicates the molar alcohol:sulphur trioxide ratio; lines have been drawn indicating equal percentages of decomposition of the ester reaction product of coconut alcohol in a period of two hours. Assuming a residence time in the first stage according to the present invention of less than two hours, the conditions to be observed during this stage are such that at all times the point on the diagram representing the molar ratio of alcohol:sulphur trioxide and temperature of the system falls on the origin side of the line AB and preferably falls within the area ABC. It will be seen that the maximum advantage of the invention is obtained by working at as low a temperature as possible.

The products according to Examples 1 and 2 are useful as detergents, wetting agents, dispersing agents, for use in shampoos, washing and cleansing compositions and the like.

It is to be understood that the invention includes processes where the interruption between the stages is merely that resulting from a change in the rate of sulphation and is not confined to processes where the stages are separated by an interval in time.

FIGURE 1 shows the rate of decomposition of coconut alcohol sulphuric acid monoester resulting from different fatty alcohol/sulphur trioxide systems at a temperature of 40° C. With a fatty alcohol/sulphur trioxide ratio of 1:0.8 in three hours a decomposition of only 3% takes place. FIGURE II shows similar results for tallow alcohol sulphuric acid monoester at a temperature of 65° C. FIGURE III shows the decomposition of tallow alcohol sulphuric acid monoester in a system where the degree of sulphation is 70% at different temperatures. At 65° C. the decomposition of the ester is about 3% in three hours.

EXAMPLE 3

This example illustrates the continuous sulphation in two stages of tallow fatty alcohol with sulphur trioxide/air.

First stage: In the first stage tallow fatty alcohol and sulphur trioxide were dosed in a molar ratio of 1:0.7.

The reaction conditions were as follows:

| Residence time, min. | 30 |
|---|---|
| Reaction temperature, ° C. | 65 |
| Amount of air used, cu.m./h. | 1 |
| $SO_3$ in the air, percent | About 14 |

The conversion in the first stage was 68.5%.

Second stage: The reaction product from the first stage flowed over to the second stage, in which, in a specific molar ratio with respect to sulphur trioxide, it was brought into contact with the sulphur trioxide/air mixture.

The reaction conditions were as follows:

| Residence time, min. | About 1 |
|---|---|
| Reaction temperature, ° C. | 52 |
| Amount of air used, cu.m./h. | 1 |
| $SO_3$ in the air, percent | About 7 |
| Excess of $SO_3$ with respect to the alcohol, percent | 5 |

The final product gave the following analysis:

|  | Percent |
|---|---|
| Active detergent | 19.4 |
| Non-detergent organic matter | 0.63 |
| Conversion | 95.4 |

EXAMPLE 4

This example illustrates the continuous sulphation in two stages of coconut fatty alcohol with sulphur trioxide/air.

First stage: In the first stage coconut fatty alcohol and sulphur trioxide were dosed in a molar ratio of 1:0.75.

The reaction conditions were as follows:

| Residence time, min. | 30 |
|---|---|
| Reaction temperature, ° C. | 54 |
| Amount of air used, cu.m./h. | 1 |
| $SO_3$ in the air, percent | About 14 |

The conversion in the first stage was 73.0%.

Second stage: The reaction product from the first stage flowed over to the second stage, in which, in a specific molar ratio with respect to $SO_3$, it was brought into contact with the sulphur trioxide/air mixture.

The reaction conditions were as follows:

| Residence time, min. | About 1 |
|---|---|
| Reaction temperature, ° C. | 42 |
| Amount of air used, cu.m./h. | 1 |
| $SO_3$ in the air, percent | About 7 |
| Excess of $SO_3$ with respect to the alcohol, percent | 8 |

The final product gave the following analysis:

|  | Percent |
|---|---|
| Active detergent | 18.3 |
| Non-detergent organic matter | 0.44 |
| Conversion | 96.8 |

EXAMPLE 5

This example illustrates a continuous co-sulphonation in two stages of a mixture of tallow fatty alcohol and alkyl benzene in a molar ratio of 1:1 with sulphur trioxide/air.

First stage: In the first stage tallow fatty alcohol/alkyl benzene and sulphur trioxide were dosed in a molar ratio of 1:0.7.

The reaction conditions were as follows:

| | |
|---|---|
| Residence time, min. | 30 |
| Reaction temperature, °C. | 62 |
| Amount of air used, cu.m./h. | 1 |
| $SO_3$ in the air, percent | About 14 |

The conversion in the first stage was 69.5%.

Second stage: The reaction product from the first stage flowed over to the second stage, in which, in a specific molar ratio with respect to $SO_3$ it was brought into contact with the sulphur trioxide/air mixture.

The reaction conditions were as follows:

| | |
|---|---|
| Residence time, min. | About 1 |
| Reaction temperature, °C. | About 55 |
| Amount of air used, cu.m./h. | 1 |
| $SO_3$ in the air, percent | About 5 |
| Excess of $SO_3$ with respect to the alcohol, percent | 7 |

The final product gave the following analysis:

| | Percent |
|---|---|
| Active detergent | 19.4 |
| Non-detergent organic matter | 0.52 |
| Conversion | 96.6 |

EXAMPLE 6

This example illustrates the continuous sulphation in two stages of secondary branched tridecyl alcohol with sulphur trioxide/air.

First stage: In the first stage tridecyl alcohol and sulphur trioxide were dosed in a molar ratio of 1:0.72.

The reaction conditions were as follows:

| | |
|---|---|
| Residence time, min. | 30 |
| Reaction temperature, °C. | 61 |
| Amount of air used, cu.m./h. | 1 |
| $SO_3$ in the air, percent | About 14 |

The conversion in the first stage was 70.3%.

Second stage: The reaction product from the first stage flowed over to the second stage, in which, in a specific molar ratio with respect to $SO_3$, it was brought into contact with the sulphur trioxide/air mixture.

The reaction conditions were as follows:

| | |
|---|---|
| Residence time, min. | About 1 |
| Reaction temperature, °C. | About 44 |
| Amount of air used, cu.m./h. | 1 |
| $SO_3$ in the air, percent | About 7 |
| Excess of $SO_3$ with respect to the alcohol, percent | 8 |

The final product gave the following analysis:

| | Percent |
|---|---|
| Active detergent | 20.4 |
| Non-detergent organic matter | 0.43 |
| Conversion | 97.0 |

EXAMPLE 7

This example illustrates the continuous sulphation in two stages of lauryl alcohol, condensed with 2 moles ethylene oxide, with sulphur trioxide.

First stage: In the first stage lauryl alcohol, condensed with 2 moles ethylene oxide, and sulphur trioxide were dosed in a molar ratio of 1:0.68.

The reaction conditions were as follows:

| | |
|---|---|
| Residence time, min. | 60 |
| Reaction temperature, °C. | 62 |
| Amount of air used, cu.m./h. | 1 |
| $SO_3$ in the air, percent | About 7 |

The conversion in the first stage was 63.4%.

Second stage: The reaction product from the first stage flowed over to the second stage, in which, in a specific molar ratio with respect to $SO_3$, it was brought into contact with the sulphur trioxide/air mixture.

The reaction conditions were as follows:

| | |
|---|---|
| Residence time, min. | 1½ |
| Reaction temperature, °C. | 53 |
| Amount of air used, cu.m./h. | 1 |
| $SO_3$ in the air, percent | About 4 |
| Excess of $SO_3$ with respect to the alcohol, percent | 12 |

The final product gave the following analysis:

| | Percent |
|---|---|
| Active detergent | 18.6 |
| Non-detergent organic matter | 0.78 |
| Converison | 94.6 |

EXAMPLE 8

This example illustrates the continuous sulphation in two stages of oleyl alcohol with sulphur trioxide/air.

First stage: In the first stage oleyl alcohol and sulphur trioxide were dosed in a molar ratio of 1:0.7.

The reaction conditions were as follows:

| | |
|---|---|
| Residence time, min. | 45 |
| Reaction temperature, °C. | 60 |
| Amount of air used, cu.m./h. | 1 |
| $SO_3$ in the air, percent | 7 |

The conversion in the first stage was 69.0%.

Second stage: The reaction product from the first stage flowed over to the second stage, in which, in a specific molar ratio with respect to the sulphur trioxide, it was brought into contact with the sulphur trioxide/air mixture.

The reaction conditions were as follows:

| | |
|---|---|
| Residence time, min. | About 1 |
| Reaction temperature, °C. | 55 |
| Amount of air used, cu.m./h. | 1 |
| $SO_3$ in the air, percent | About 4 |
| Excess of $SO_3$ with respect to the alcohol, percent | 5 |

The final product gave the following analysis:

| | Percent |
|---|---|
| Active detergent | 13.7 |
| Non-detergent organic matter | 0.63 |
| Conversion | 94.5 |

The sulphated product contained about 20% of sulphonate.

The products of the invention are useful as detergents, wetting agents, dispersing agents, for use in shampoos, washing and cleansing compositions and the like.

What is claimed is:

1. A process for the sulphation of fatty alcohols or ethylene oxide condensates thereof having at least 8 carbon atoms with a mixture of sulphur trioxide and an inert gas, characterised in that the process is carried out in two stages, in which the first stage, with a relatively long residence time of the order of about ½ to 2 hours and a stoichiometric deficiency of sulphur trioxide, during which the reaction mass is being cooled, the alcohols are sulphated in the order of about 70% conversion and hence to such an extent that a decomposition takes place of less than 5% of the sulphuric acid monoester reaction product, and in which the second stage the sulphation is completed with a stoichiometric excess of sulphur trioxide as quickly as possible with a relatively short residence time of the order of about 1 to 15 minutes followed by immediate neutralisation of the reaction mixture, the sulphur trioxide to inert gas ratio in the second stage being lower than that in the first stage.

2. A process according to claim 1, characterised in that alcohols with a melting point above 50° C. are used.

3. A process according to claim 2, characterised in that tallow fatty alcohols are used.

4. A process according to claim 1, characterised in that the first step is carried out batchwise or continuously, the second step always being carried out continuously.

5. A process according to claim 1, characterised that part of the alcohols is replaced by alkyl benzenes, in which the alkyl chain contains up to 18 carbon atoms.

References Cited by the Examiner

UNITED STATES PATENTS

| | | | |
|---|---|---|---|
| 2,256,877 | 9/1941 | Bertsch | 260—459 XR |
| 2,325,270 | 8/1943 | Werntz | 260—459 |
| 2,634,287 | 4/1953 | Fincke | 260—459 |
| 2,691,040 | 10/1954 | Bloch et al. | 260—459 XR |
| 2,768,199 | 10/1956 | Luntz et al. | 260—686 XR |
| 3,024,258 | 3/1962 | Brooks et al. | 260—459 XR |
| 3,058,920 | 10/1962 | Brooks et al. | 260—686 XR |
| 3,200,140 | 8/1965 | Sowerby | 260—459 |

OTHER REFERENCES

Weil et al.: J. Oil Chem. Soc., vol. 36, pp. 241–244 (1959), TP1.05.

CHARLES B. PARKER, *Primary Examiner.*

F. D. HIGEL, *Assistant Examiner.*